Patented May 23, 1933

1,910,547

UNITED STATES PATENT OFFICE

ROBERT GILBERT JAMES, OF BIRMINGHAM, AND DOUGLAS FRANK TWISS, OF WYLDE GREEN, ENGLAND, ASSIGNORS TO AMERICAN ANODE, INC., OF AKRON, OHIO, A CORPORATION OF DELAWARE

METHOD OF MANUFACTURING ARTICLES OF RUBBER FROM AQUEOUS DISPERSIONS

No Drawing. Application filed May 31, 1930, Serial No. 458,912, and in Great Britain June 6, 1929.

This invention relates to a method of manufacturing articles of rubber from aqueous dispersions by electro-deposition on an electrode or on a porous diaphragm surrounding an electrode. More particularly it relates to an improvement in or modification of the method described and claimed in application Serial No. 284,014 filed June 8, 1928. In the process of said application S. No. 284,014, the articles are made from an aqueous dispersion of organic or rubber like material the individual dispersed particles of which normally possess an electro-negative charge. These electro-negative charges are replaced by electro-positive charges by increasing the hydrogen ion concentration and the articles are then formed by subjecting the dispersions, while still in a non-coagulated condition, to electric or electro-phoretic deposition upon cathodes or upon porous diaphragms or molds of the required dimension and form surrounding the cathode.

When rubber latex is treated with such acids as acetic acid it rapidly becomes coagulated, the globules coalescing to form a coherent mass or masses of rubber. If a larger concentration of hydrogen ions than is present in acetic acid solutions is introduced rapidly into the latex, coagulation of the latex may be avoided to a substantial degree and the latex so treated can be kept for a considerable period. When the hydrogen ion concentration has thus been made sufficiently great, the rubber globules will have assumed a positive electric charge and if an anode and cathode of suitable material are then inserted in the latex, the globules tend to migrate towards the cathode.

An object of the present invention is to provide a method of producing an acid latex with positively charged rubber globules and in which a minimum loss of rubber by coagulation occurs.

According to the present invention the replacement of the electro-negative charges by electro-positive charges through increase in the hydrogen ion concentration is effected in the presence of formaldehyde.

In carrying out the process of the present invention the natural protective colloids in the latex may provide sufficient protection to the colloids and it is therefore not necessary to introduce any additional protective agent or protective colloid when ammoniated latex is used whether natural or dialyzed.

With latices which have been deprived of part of their natural protective colloids, as for example by centrifuging, it may be desirable or even necessary to introduce a small quantity of protective colloid such as blood albumen. The introduction of a small quantity of protective colloid under these circumstances has the advantage of allowing a greater latitude in the adjustment of the pH value of the ammonia containing latex by the method above indicated prior to the addition of the acetic acid. This added protective colloid may be introduced either before, during or after the treatment of the ammonia containing latex with formaldehyde.

The gradual addition of formaldehyde to the usual ammonia preserved latex causes a reduction in the alkalinity of the latex and the latex finally reaches the acid side of neutrality. That is, the pH value decreases to below 7 without coagulation. The rubber globules in latex treated in this manner, however, apparently retain their electro-negative charge inasmuch as upon application of an electric current, these particles migrate to the anode. The pH value can be reduced in this way to about 4.5 without substantial aggregation of the globules. At a value of 4.5, however, flocculation sets in.

In the present invention acid, as for example acetic acid, is added to an ammoniated latex which has been reduced to a pH value on the acid side of neutrality by the addition of formaldehyde. When the latex, upon addition of the acid, passes the iso-electric point, that is, having a pH value of approximately 4.1, the particles assume a positive electric charge inasmuch as the rubber globules migrate to the cathode upon the application of an electric current.

If an additional protective colloid is introduced into the latex as mentioned above, the proportion of added formaldehyde may be less than that necessary to produce a pH value of 7 and, under these conditions, the final pH value of the latex before the addition of the acid may even be slightly on the alkaline side of neutrality. For example, the pH value may be between 7 and 8.

The aqueous dispersions to which the invention may be applied may be of rubber, gutta percha, balata or other vegetable resins analogous thereto, or to similar synthetic or artificial resins and may be unvulcanized, or vulcanized, or may contain vulcanizing or compounding ingredients, or both, and may be in a preserved state or a concentrated state, or both. It may be applied to other rubber materials, as for example, rubber reclaim and synthetic rubber.

Examples of specific embodiments of the invention are as follows:

*Example I*

100 parts of ammoniated natural rubber latex containing 35 parts of rubber and 0.6 parts of ammonia are treated with 38% aqueous formaldehyde solution so that the pH value of the resulting mixture falls to approximately 6. 50 parts of distilled water are then added. Into the well stirred mixture there are now poured 100 parts of 40% acetic acid solution, whereupon a mobile acid dispersion containing p o s i t i v e l y charged particles results.

*Example II*

To 100 parts of ammoniated latex which has been concentrated by centrifuging containing 60 parts of rubber and 0.5 parts of ammonia, sufficient 38% formaldehyde solution is added to give the mixture a pH measured 10 to 15 minutes after the addition, of approximately 7.5.

100 parts of neutral aqueous solution containing 0.7 parts of casein previously dissolved in the minimum amount of dilute ammonia are now added, and finally 100 parts of 60% acetic acid are rapidly poured into the well stirred mixture. The particles contained in the resulting mobile acid dispersion possesses a positive electric charge.

The present invention thus enables an acid latex to be produced with positively charged rubber particles or globules, and in which little or no loss of rubber occurs through coagulation of the dispersed particles.

What we claim is:

1. A method of changing the electro-negative charges of organic particles dispersed in an aqueous medium to positive charges which comprises increasing the hydrogen ion concentration in said aqueous medium in the presence of formaldehyde until the aqueous medium is on the acid side of the iso-electric point.

2. A method of changing electro-negative charges of organic particles dispersed in an aqueous dispersing medium to positive charges which comprises adding formaldehyde to said medium, and thereafter increasing the hydrogen ion concentration therein until the aqueous medium is on the acid side of the iso-electric point.

3. The process of claim 1 in which the dispersed organic materials are protected with protective colloids.

4. The process as claimed in claim 2 in which the final pH value before inversion of the charges on the dispersed particles is between 7 and 8.

5. A method of changing the electro-negative charges of the rubber particles of latex to positive charges which comprises increasing the hydrogen ion concentration of the liquid approximately to neutrality, adding formaldehyde, and then adding an acid until the latex is on the acid side of the iso-electric point.

6. A method of changing the electro-negative charges of the rubber particles of latex to positive charges which comprises increasing the hydrogen ion concentration of the liquid to a pH value between 7 and 8, adding a protective colloid and formaldehyde, and then adding an acid until the latex is on the acid side of the iso-electric point.

In witness whereof, we have hereunto signed our names.

ROBERT GILBERT JAMES.
DOUGLAS FRANK TWISS.